United States Patent
Bondalapati et al.

(10) Patent No.: US 12,317,088 B2
(45) Date of Patent: May 27, 2025

(54) SELECTING RADIO RESOURCE MANAGEMENT SCHEMES BASED ON ENVIRONMENT ASSESSMENTS

(71) Applicant: Meta Platforms, Inc., Menlo Park, CA (US)

(72) Inventors: Pratheep Bondalapati, Woodland Hills, CA (US); Po Han Huang, The Woodlands, TX (US); Haleema Mehmood, Arlington, VA (US); Krishna Srikanth Gomadam, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 435 days.

(21) Appl. No.: 17/981,938

(22) Filed: Nov. 7, 2022

(65) Prior Publication Data

US 2024/0155352 A1    May 9, 2024

(51) Int. Cl.
*H04W 16/10*    (2009.01)
*H04W 24/08*    (2009.01)

(52) U.S. Cl.
CPC ........... *H04W 16/10* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 10,863,400 B1 * | 12/2020 | Wang | H04L 43/16 |
| 10,904,774 B2 | 1/2021 | Halabian et al. | |
| 11,252,656 B2 | 2/2022 | Ergen | |
| 2014/0079014 A1 * | 3/2014 | Lee | H04W 74/0808 370/329 |
| 2022/0060993 A1 | 2/2022 | Wang et al. | |

FOREIGN PATENT DOCUMENTS

EP    3182620 A1 *   6/2017

OTHER PUBLICATIONS

Marjan R. K., et al., "Design and Evaluation of Wi-Fi Network Heat Map Generator," 1st Al-Noor International Conference for Science and Technology, Oct. 29, 2019, pp. 14-19.

NetSpot, "What is RSSI and its Relation to a Wi-Fi Network," Retrieved from Internet: https://www.netspotapp.com/wifi-signal-strength/what-is-rssi-level.html, Retrieved on Jul. 20, 2022, 19 pages.

* cited by examiner

*Primary Examiner* — Peter P Chau
(74) *Attorney, Agent, or Firm* — Eversheds Sutherland (US) LLP (57) ABSTRACT

A method for selecting a radio resource management scheme is disclosed. A distance between two wireless access points of two wireless local area networks is received. A calculated signal strength corresponding to the distance is determined. One or more signal strengths associated with communication between the two wireless access points are received. A difference between a first value associated with the received one or more signal strengths and a second value associated with the calculated signal strength is determined. The difference is compared to a threshold difference value to determine an environment assessment result. Based on the environment assessment result, an option among a plurality of radio resource management scheme options is selected for at least the two wireless access points.

20 Claims, 5 Drawing Sheets

SELECTING RADIO RESOURCE MANAGEMENT SCHEMES BASED ON ENVIRONMENT ASSESSMENTS

BACKGROUND OF THE INVENTION

In computer networking, an access point (AP) is a networking hardware device that allows Wi-Fi devices to connect to a wired network. An access point connects directly to a wired local area network, typically Ethernet, and the access point then provides wireless connections using wireless LAN technology, typically Wi-Fi, for other devices to use that wired connection. Access points support the connection of multiple wireless devices through their one wired connection. Multiple access points can be deployed in an organization, and users roaming with their mobile devices are handed off from one access point to another.

Figure 1:
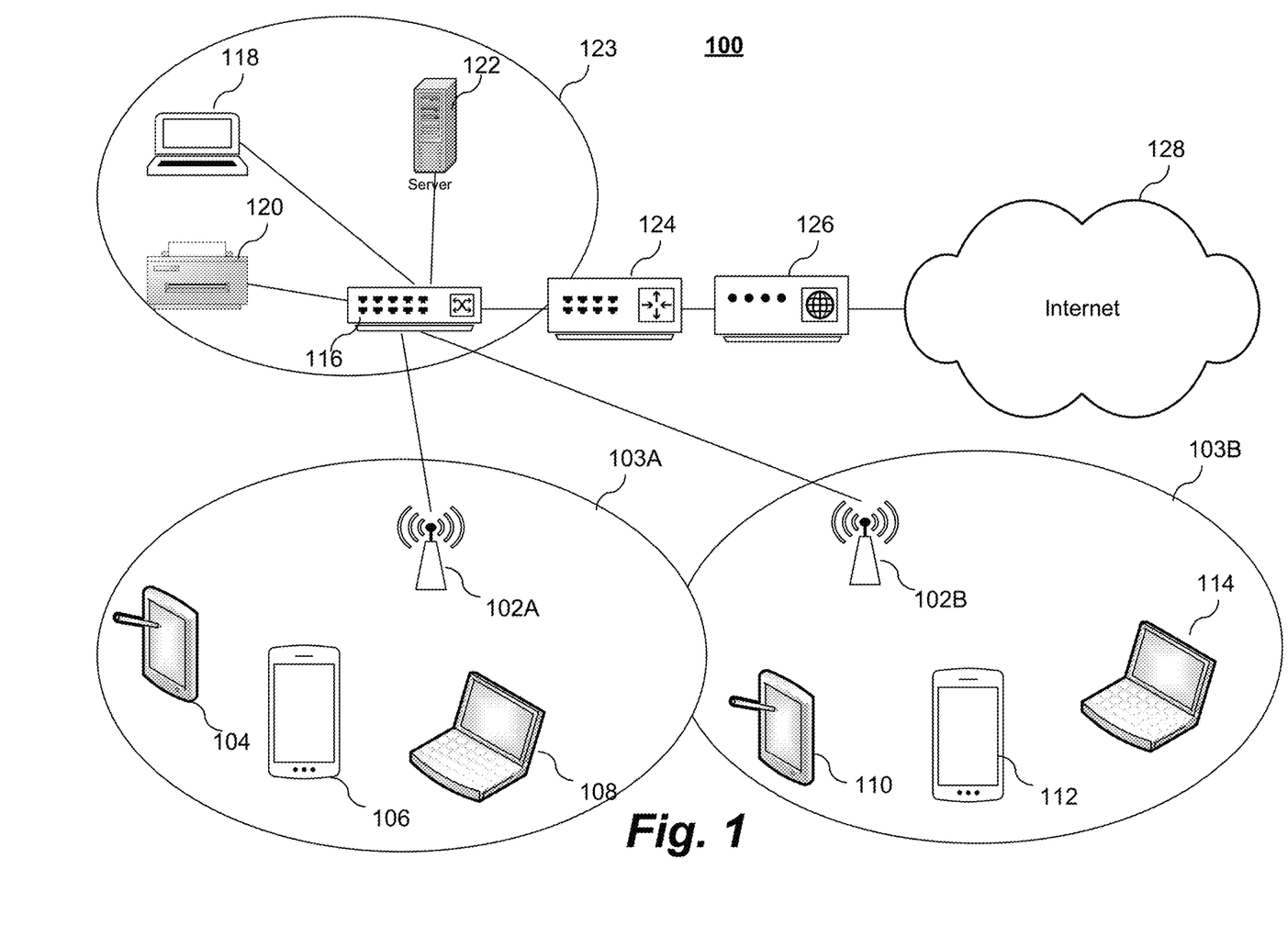
FIG. 1 illustrates an exemplary business network 100.

FIG. 1 illustrates an exemplary business network 100. As shown, business network 100 is a local area network (LAN), including one or more wireless local area networks (wireless LANs) and a wired local area network (wired LAN). Access point 102A creates the first wireless LAN 103A, and access point 102B creates a second wireless LAN 103B. Wi-Fi devices 104, 106, and 108 are connected to access point 102A via wireless LAN 103A. Wi-Fi devices 110, 112, and 114 are connected to access point 102B via wireless LAN 103B. Wi-Fi devices may include laptop computers, smartphones, tablets, printers, video streaming devices, gaming consoles, home automation devices, security cameras, speakers, stereo systems, and the like.

Access point 102A connects directly to a wired local area network 123 via an Ethernet switch 116. Similarly, access point 102B connects directly to wired local area network 123 via Ethernet switch 116. Different devices 118, 120, and 122 are connected to Ethernet switch 116 via the wired LAN 123. Devices 118, 120, and 122 may include computers, workstations, printers, servers, and the like.

Ethernet switch 116 connects to a router 124. Router 124 is further connected to the Internet 128 via a device 126. Device 126 may be a cable modem or a Digital Subscriber Loop (DSL) modem. Device 126 may also be an Optical Network Terminal (ONT) for providing a Fiber Optic Service (FiOS). Device 126 may be a Channel Service Unit (CSU) or a Data Service Unit (DSU).

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

With reference to FIG. 1, business network 100 has multiple wireless LANs (103A and 103B) and users roaming with their Wi-Fi devices are handed off from one access point to another. When several users and adjacent access points share the same frequency channel, it may not be possible to achieve the maximum channel capacity. Efficient radio resource management schemes may increase the system spectral efficiency by an order of magnitude, which often is considerably more than what is possible by introducing advanced channel coding and source coding schemes. Radio resource management is especially important in systems limited by co-channel interference rather than by noise, for example, wireless networks including many adjacent access points that may reuse the same channel frequencies.

Radio resource management (RRM) is the system level management of co-channel interference, radio resources, and other radio transmission characteristics in wireless communication systems, including wireless local area networks. Radio resource management involves strategies and algorithms for controlling parameters such as transmit power, user allocation, channel assignments, bandwidth assignments, beamforming, data rates, handover criteria, modulation scheme, error coding scheme, and the like. The objective is to utilize the limited radio-frequency spectrum resources and radio network infrastructure as efficiently as possible to optimize the network performance, including increasing the data rate, reducing the interference, etc.

Using radio resource management, the radio frequency (RF) environment is being monitored. Typically, a controller may collect information of the RF environment (e.g., from the Wi-Fi devices) and make changes to the access point channels and power levels to reduce noise, interference from other devices, coverage gaps, and co-channel interference caused by the network.

Figure 2:
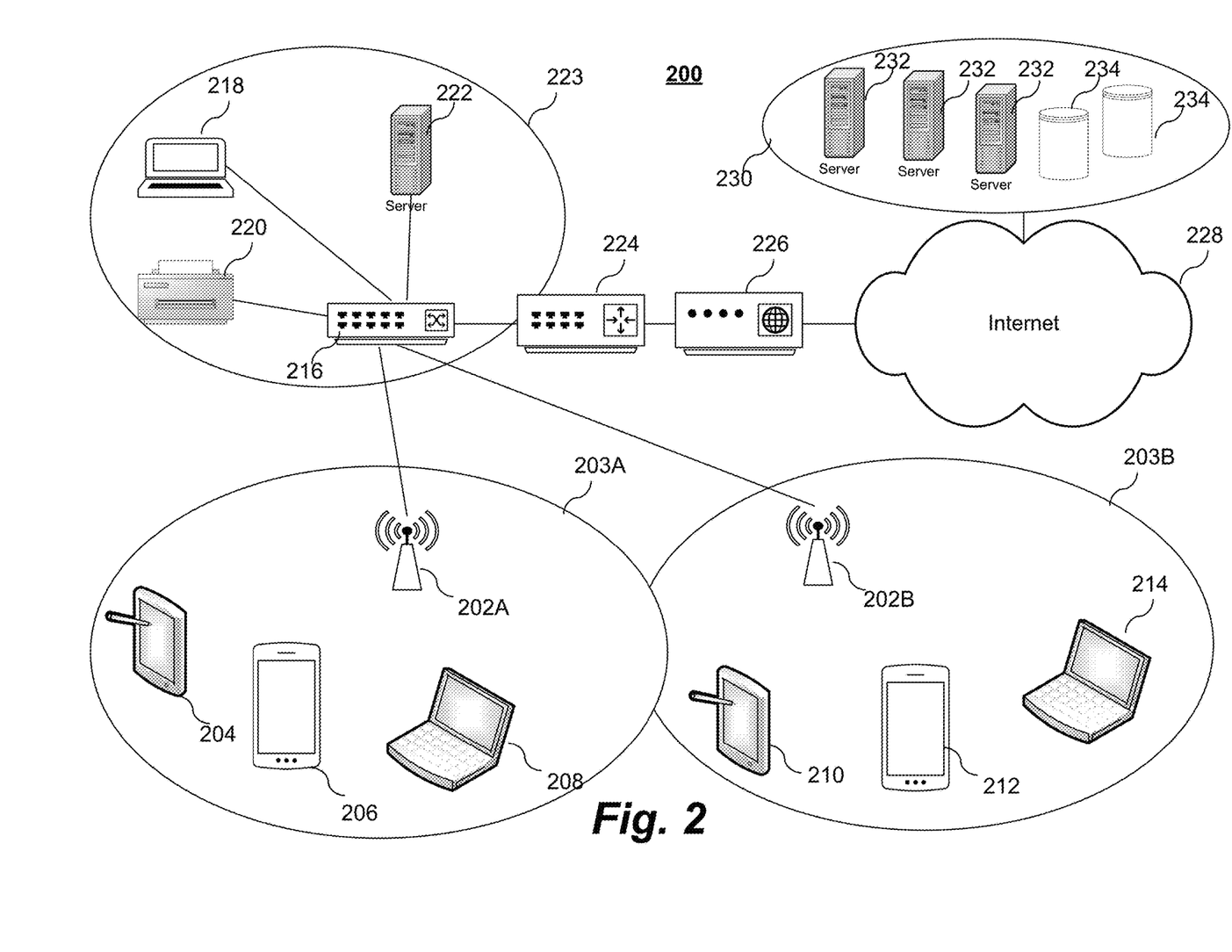
FIG. 2 illustrates an exemplary business network 200 including a cloud computing platform for performing radio resource management for business network 200.

In some embodiments, radio resource management may be performed by a radio resource management controller located in a cloud computing platform accessible over the Internet. FIG. 2 illustrates an exemplary business network 200 including a cloud computing platform for performing radio resource management for business network 200. Business network 200 includes a local area network (LAN), including one or more wireless local area networks (wireless LANs) and a wired local area network (wired LAN). Access point 202A creates the first wireless LAN 203A, and access point 202B creates a second wireless LAN 203B. Wi-Fi devices 204, 206, and 208 are connected to access point 202A via wireless LAN 203A. Wi-Fi devices 210, 212, and 214 are connected to access point 202B via wireless LAN 203B. Wi-Fi devices may include laptop computers, smartphones, tablets, printers, video streaming devices, gaming consoles, home automation devices, security cameras, speakers, stereo systems, and the like.

Access point 202A connects directly to a wired local area network 223 via an Ethernet switch 216. Similarly, access point 202B connects directly to wired local area network 223 via Ethernet switch 216. Different devices 218, 220, and 222 are connected to Ethernet switch 216 via the wired LAN 223. Devices 218, 220, and 222 may include computers, workstations, printers, servers, and the like.

Ethernet switch 216 connects to a router 224. Router 224 is further connected to the Internet 228 via a device 226. Device 226 may be a cable modem, a Digital Subscriber Loop (DSL) modem, an Optical Network Terminal (ONT) for providing a Fiber Optic Service (FiOS), a Channel Service Unit (CSU), a Data Service Unit (DSU), and the like.

In addition, business network 200 includes a cloud computing platform for performing radio resource management for business network 200. Cloud computing comprises two components, a frontend portion and a backend 230 portion of the cloud computing platform. The frontend includes the client part of the cloud computing platform. It includes interfaces and applications that are used to access the cloud computing platform. For example, access points 202A and 202B may each include client-side interfaces and applications that are used to access the cloud computing platform. Backend 230 includes the resources required for providing the cloud computing services, including one or more servers 232 and one or more databases 234. For example, the radio resource management controller may be executed on the servers 232. Servers 232 may include web, application, or database servers. Backend 230 may further include virtual machines, data storage, security mechanisms, and the like. Internet 228 acts as the bridge or medium between the frontend portion and backend 230, establishing the interaction and communication between the frontend portion and backend 230.

Different radio resource management schemes may be implemented in wireless LAN 203A and wireless LAN 203B. One radio resource management technique (herein also referred to as the dynamic measurement radio resource management technique) collects feedback from the clients and nearby APs. It collects and uses the client-side live measurements and AP-AP live measurements (i.e., scan results) to dynamically determine the optimum configurations for the access points in the wireless LANs such that the limited radio-frequency spectrum resources and radio network infrastructure may be utilized as efficiently as possible.

Figure 3:
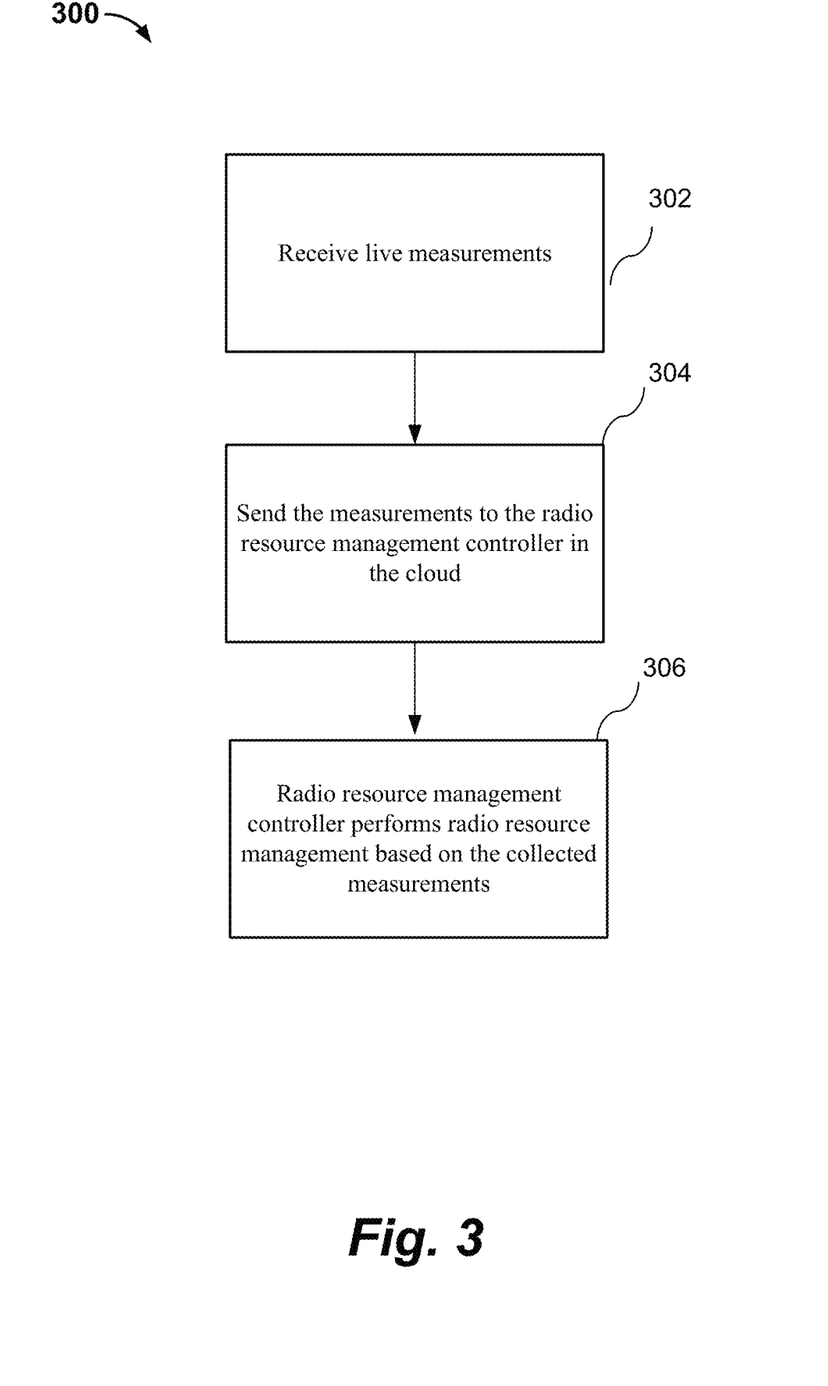
FIG. 3 illustrates an exemplary process 300 for the dynamic measurement radio resource management technique.

FIG. 3 illustrates an exemplary process 300 for the dynamic measurement radio resource management technique. At step 302, an access point receives client-side live measurements from the Wi-Fi devices or AP-AP live measurements. For example, the Wi-Fi devices 204, 206, and 208 that are connected to access point 202A via wireless LAN 203A may each collect live measurements over time and send the collected measurements to access point 202A. Similarly, Wi-Fi devices 210, 212, and 214 that are connected to access point 202B via wireless LAN 203B may each collect live measurements over time and send the collected measurements to access point 202B. Access point 202A may collect live measurements of any AP-AP communication with access point 202B, and vice versa.

The measurements may include any statistics, metrics, or results that are dynamically collected by the Wi-Fi devices or the APs over time. The measurements collected by the Wi-Fi devices or the APs are dynamic because they can be continuously changing or developing. The measurements may include any measurements or indicators of the RF environment experienced by the Wi-Fi devices or the APs, including the spectrum conditions and usage, the strength of the signals that occupy the spectrum, the quality and performance of the connections, and the like.

Examples of the dynamic measurements may include, but are not limited to, "ack_signal," "air_time," "idle_time," "rx_bytes," "rx_packets," "rx_rate," "tx_bytes," "tx_packets," "tx_rate," "mcs," "nss," "sgi," "vht," "tx_retries," and the like. "ack_signal" is a signal to signify acknowledgment or receipt of a message. "air_time" is a measure of how much time a Wi-Fi channel is utilized. "idle-time specifies the length of time that a connection is idle. "rx_bytes" is the number of good received bytes. "rx_packets" specifies the number of received packets. "rx_rate" specifies the received data rate (in Mbps). "tx_bytes" specifies the total number of bytes that are sent through the Ethernet interface. "tx_packets" specifies the number of transmitted packets. "tx_rate" specifies the transmit data rate (in Mbps). "mcs" specifies the modulation and coding scheme. "nss" specifies the number of spatial streams. Wi-Fi spatial streaming or multiplexing (often shortened to SM or SMX) is a transmission technique to transmit independent and separately coded data signals, known as streams, from each of the multiple transmit antennas. This results in the space being reused, or multiplexed, more than one time. "sgi" is a Short Guard Interval (SGI), which lowers the interval to 400 ns that can give an increased data rate of 11%. "vht" is Very High Throughput (VHT), which can achieve a speed of up to 1.3 Gigabit per second, as it takes advantage of advanced modulation techniques that allow the technology to pack more bits of data into every transmission. "tx_retries" specifies the percentage of attempts to retransmit data frames.

One main type of dynamic measurements collected over time is the received signal strength indicator (RSSI). Because signal strength can vary greatly, the functionality in wireless networking can be significantly affected. RSSI is a measurement unit utilized in wireless network devices to estimate the transmission channel's status or network access point strength.

RSSI is a measurement of the power of a received radio signal. It measures Wi-Fi signal strength at the time when the signals are received by the Wi-Fi devices. RSSI is an indication of the power level being received by the receiving radio after the antenna and possible cable loss. RSSI is usually measured in dBm. An RSSI value that is closer to zero indicates a stronger signal strength. For instance, −50 is a good signal, while −80 is a reasonable value, and −100 is a bad signal.

At step 304, the access point sends the collected measurements to the radio resource management controller in the cloud. For example, access point 202A may send the collected measurements to the radio resource management controller located in the backend 230 portion of the cloud computing platform via the frontend client-side interface of access point 202A. Similarly, access point 202B may send the collected measurements to the radio resource management controller located in the backend 230 portion of the cloud computing platform via the frontend client-side interface of access point 202B.

At step 306, the radio resource management controller performs radio resource management based on the collected measurements. The radio resource management controller optimizes the various controlling parameters, such as the transmit power, user allocation, channel assignments, bandwidth assignments, beamforming, data rates, handover criteria, modulation and coding scheme, and error coding scheme, to utilize the limited radio-frequency spectrum resources and radio network infrastructure efficiently.

A second radio resource management technique (herein also referred to as the model-based radio resource management technique) combines modeling and optimization to determine the optimum configurations for the access points in the wireless LANs such that the limited radio-frequency spectrum resources and radio network infrastructure may be utilized efficiently.

Model-based radio resource management uses a model representation of the wireless LANs to generate data and help determine decisions or make predictions about the performance of the wireless LANs. The model includes a number of governing equations that describe how the values of the unknown variables (i.e., the dependent variables) change when one or more of the known (i.e., independent) variables change. The values of the independent variables may be received as configuration inputs. The values of the independent variables may also be determined based on configuration inputs in combination with real measurements received from the Wi-Fi devices or the access points. Examples of the independent variables may include the locations of the access points and the distances between the access points. Independent variables may also include the locations of the Wi-Fi client devices, including the distances of the Wi-Fi devices from the access points, the directions of the Wi-Fi devices from the access points, and the relative positions of the Wi-Fi devices from each other. The model is created based at least in part on this information to predict the strength and quality of the signals received by the Wi-Fi devices.

In some embodiments, the model is a digital-twin model. A digital twin is a digital representation of a physical object, process, or service. A digital twin can be a digital replica of an object in the physical world, such as a jet engine or wind farms, or even larger items such as buildings or even whole cities. The digital twin technology can be used to replicate processes in order to collect data to predict how they will perform. A digital twin is a computer program that uses real world data to create simulations that can predict how a product or process will perform.

Both the dynamic measurement radio resource management technique and the model-based radio resource management technique have their own pros and cons. In some situations, the dynamic measurement radio resource management technique performs better than the model-based radio resource management technique, and vice versa.

The dynamic measurement radio resource management technique may face stability or convergence issues. As a user and its mobile Wi-Fi device may move from one location to another, the measurements received from that Wi-Fi device may also change rapidly and frequently. Due to the dynamic nature of the feedbacks and the fluctuations in value of the measurements, the system may become unstable. Radio resource management modules should employ convergent and stable optimization algorithms that do not create a continuous ripple of radio parameter adjustments across a deployed Wi-Fi network. Unstable or non-convergent radio resource management solutions could adversely impact the user experience. Another disadvantage of the dynamic measurement radio resource management technique is that many corner cases may be left unresolved.

The model-based radio resource management technique has a number of advantages. It does not rely on measurements that are constantly changing. In addition, by using models to make predictions, a global optimization may be obtained. However, the model-based radio resource management technique may face complexity issues. For example, its complexity may grow exponentially with reducing step-size and at certain minimum or maximum transmit power levels. Its complexity may grow even further when optimization is performed along with channel assignment. Another disadvantage of the technique is that it requires accurate locations of the access points and the Wi-Fi devices. For example, there may be multiple access points at a home network, and accurate locations of the access points in the house may be difficult to obtain.

Therefore, a technique of selecting either the dynamic measurement radio resource management technique or the model-based radio resource management technique for a wireless LAN in a certain wireless environment to achieve stability, reduce the computing complexity, and achieve the best performance would be desirable.

In the present application, a method for selecting a radio resource management scheme is disclosed. A distance between two wireless access points of two wireless local area networks is received. A calculated signal strength corresponding to the distance is determined. One or more signal strengths associated with communication between the two wireless access points are received. A difference between a first value associated with the received one or more signal strengths and a second value associated with the calculated signal strength is determined. The difference is compared to a threshold difference value to determine an environment assessment result. Based on the environment assessment result, an option among a plurality of radio resource management scheme options is selected for at least the two wireless access points.

A system for radio resource management is disclosed. The system comprises a processor. The processor is configured to receive a distance between two wireless access points of two wireless local area networks. The processor is configured to determine a calculated signal strength corresponding to the distance. The processor is configured to receive one or more signal strengths associated with communication between the two wireless access points. The processor is configured to determine a difference between a first value associated with the received one or more signal strengths and a second value associated with the calculated signal strength. The processor is configured to compare the difference to a threshold difference value to determine an environment assessment result. Based on the environment assessment result, the processor is configured to select an option among a plurality of radio resource management scheme options for at least the two wireless access points. The system comprises a memory coupled to the processor and configured to provide the processor with instructions.

A computer program product embodied in a non-transitory computer readable medium and comprising computer instructions for radio resource management is disclosed. A distance between two wireless access points of two wireless local area networks is received by a radio resource management (RRM) controller. A calculated signal strength corresponding to the distance is determined by the RRM controller. One or more signal strengths associated with communication between the two wireless access points are received by the RRM controller. A difference between a first value associated with the received one or more signal strengths and a second value associated with the calculated signal strength is determined by the RRM controller. The difference is compared to a threshold difference value by the RRM controller to determine an environment assessment result. Based on the environment assessment result, an option among a plurality of radio resource management scheme options is selected by the RRM controller for at least the two wireless access points.

Figure 4:
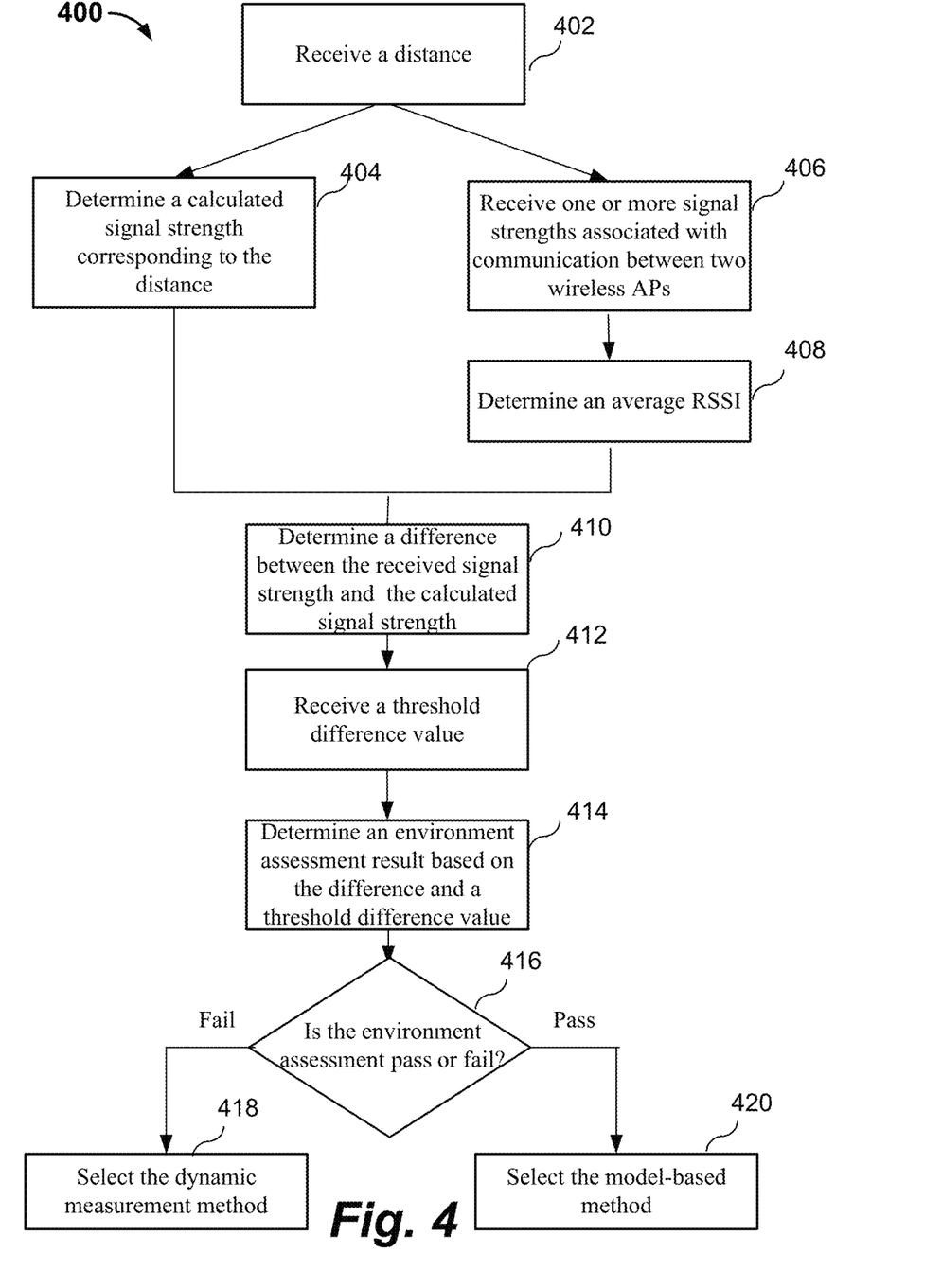
FIG. 4 illustrates an exemplary process 400 for selecting a radio resource management scheme for a wireless LAN in a certain wireless environment.

FIG. 4 illustrates an exemplary process 400 for selecting a radio resource management scheme for a wireless LAN in a certain wireless environment. In some embodiments, process 400 is performed by a radio resource management controller to select a radio resource management scheme for a wireless LAN (e.g., wireless LAN 203A or wireless LAN 203B) in business network 200. In some embodiments, the radio resource management controller is implemented in the cloud. As described above, business network 200 includes a cloud computing platform. Cloud computing comprises two components, a frontend portion and a backend 230 portion of the cloud computing platform. The frontend includes the client part of the cloud computing platform. It includes interfaces and applications that are used to access the cloud computing platform. For example, access points 202A and 202B may each include client-side interfaces and applications that are used to access the cloud computing platform. Backend 230 includes the resources required for providing the cloud computing services. For example, the radio resource management controller may be implemented by the servers 232 and databases 234. In some embodiments, the radio resource management controller is performed by software or firmware executed on an access point.

At step 402, a distance between two wireless access points of two wireless local area networks is received as an input parameter. For example, the two access points 202A and 202B are deployed in a home or an office, and they are positioned five meters apart. An administrative person may enter a distance of five meters through an interface or application. For example, if the radio resource management controller is implemented in the cloud, then the interface or application is the frontend portion of the cloud computing platform. The entered value is then sent to and received by the radio resource management controller, which is part of the backend 230 of the cloud computing platform. If the radio resource management controller is implemented on an access point, then the interface or application may be an interface on the access point itself.

At step 404, a calculated signal strength corresponding to the distance is determined. In some embodiments, the calculated signal strength is an estimated value of the power of a radio signal received by one of the two wireless access points (e.g., access point 202B), wherein the radio signal is sent by the other of the two wireless access points (e.g., access point 202A). In some embodiments, the calculated signal strength is an estimated received signal strength indicator (RSSI) at one of the two wireless access points. The calculated signal strength may be calculated by the radio resource management controller based on a radio propagation model, also known as the radio wave propagation model or the radio frequency propagation model. Radio propagation is the behavior of radio waves as they travel, or are propagated, from one point to another. Radio waves are affected by the phenomena of reflection, refraction, diffraction, absorption, polarization, and scattering. A radio propagation model is an empirical mathematical formulation for the characterization of radio wave propagation as a function of frequency, distance, and other conditions.

At step 406, one or more signal strengths associated with the communication between two wireless access points of the two wireless local area networks are received. In some embodiments, the signal strength is a received signal strength indicator (RSSI). RSSI is a measurement of the power of a received radio signal. It measures Wi-Fi signal strength at the time when the signals are received. RSSI is an indication of the power level being received by the receiving radio after the antenna and possible cable loss. RSSI is usually measured in dBm. An RSSI value that is closer to zero indicates a stronger signal strength. For instance, −50 is a good signal, while −80 is a reasonable value, and −100 is a bad signal. The received signal strength is the power of a radio signal sent by one of the access points (e.g., access point 202A) when the radio signal is received by the other access point (e.g., access point 202B). The receiving access point (i.e., access point 202B) then sends the received signal strengths to the radio resource management controller. If the controller is in the cloud, access point 202B may send the received signal strengths to the radio resource management controller located in the backend 230 portion of the cloud computing platform via the frontend client-side interface of access point 202B. In some embodiments, the signal strengths received by both access points may be received by the radio resource management controller in the cloud.

At step 408, an average received signal strength indicator (RSSI average) may be determined based on the one or more signal strengths associated with the communication between the two wireless access points of the two wireless local area networks that are received at step 406. In some embodiments, the one or more signal strengths may be collected over a period of time, and the average RSSI is the average value of the one or more signal strengths over that period of time. In some embodiments, the period of time is one minute to two minutes. In some embodiments, the one or more signal strengths are signal strengths received by both access points, and RSSI average is an average of the signal strengths received by access point 202A and the signal strengths received by access points 202B.

At step 410, a difference between a first value associated with the received signal strengths and a second value associated with the calculated signal strength is determined. The difference is also referred to as the RSSI delta. In some embodiments, the first value associated with the received signal strengths is the average RSSI obtained at step 408, and the second value associated with the calculated signal strength is the calculated signal strength corresponding to the distance determined at step 404, and the difference is an absolute value of the difference of the two values.

At step 412, a predetermined threshold difference value is received as an input parameter. The predetermined threshold difference value is also referred to as the RSSI margin. For example, the RSSI margin may be equal to 5-10 dB.

At step 414, the difference obtained at step 410 (RSSI delta) is compared to the predetermined threshold difference value (RSSI margin) to determine an environment assessment result. If RSSI delta is less than or equal to RSSI margin, then the environment assessment is evaluated as pass. For example, suppose that RSSI margin is configured as 5 dB, and if RSSI delta is less than or equal to 5 dB, then it is very likely that there are very few obstacles between the two access points and there is a line of sight (LOS) between the two access points. Therefore, the environment assessment is satisfactory and is above a certain threshold level. If the environment assessment is evaluated as pass, then using the model-based radio resource management technique may result in fewer prediction errors.

However, if the RSSI delta is greater than 5 dB, then it is very likely that there are obstacles between the two access points and there is no line of sight (LOS) between the two access points. Therefore, the environment assessment is unsatisfactory and is below a certain threshold level. If the environment assessment is evaluated as fail, then using the model-based radio resource management technique may result in more prediction errors, and therefore the dynamic measurement radio resource management technique may be a better option than the model-based radio resource management technique.

At step 416, based on the environment assessment result, an option among a plurality of radio resource management scheme options is selected for at least the two wireless access points. It is determined whether the environmental assessment result is pass or fail. In response to the environmental assessment being evaluated as fail, process 400 proceeds to step 418. In response to the environmental assessment being evaluated as pass, process 400 proceeds to step 420.

At step 418, the dynamic measurement radio resource management technique is selected. In some embodiments, process 300 as shown in FIG. 3 may be performed at step 418. At step 420, the model-based radio resource management technique is selected.

The advantage of this selection technique is that it uses the measurements from the access points to quantify the estimated performance improvement of two different optimization algorithms and selects one of them. The technique is an efficient way to assess the wireless environment based on simple measurements. The technique is easily scalable to several hundreds of access points in different environments, including shopping malls, large offices, school campuses, and the like.

Figure 5:
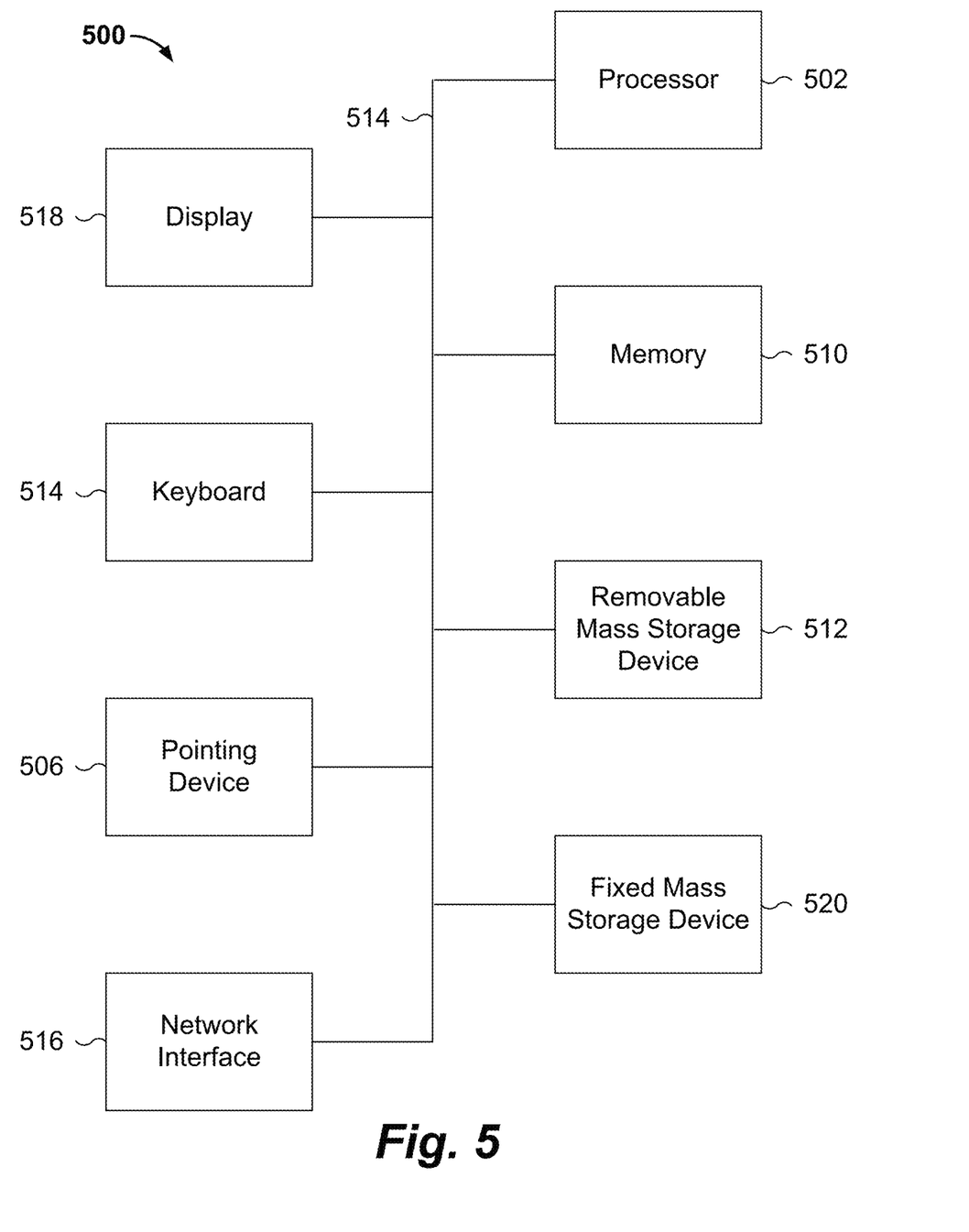
FIG. 5 is a functional diagram illustrating a programmed computer system for executing some of the processes in accordance with some embodiments.

FIG. 5 is a functional diagram illustrating a programmed computer system for executing some of the processes in accordance with some embodiments. As will be apparent, other computer system architectures and configurations can be used as well. Computer system 500, which includes various subsystems as described below, includes at least one microprocessor subsystem (also referred to as a processor or a central processing unit (CPU)) 502. For example, processor 502 can be implemented by a single-chip processor or by multiple processors. In some embodiments, processor 502 is a general purpose digital processor that controls the operation of the computer system 500. Using instructions retrieved from memory 510, the processor 502 controls the reception and manipulation of input data, and the output and display of data on output devices (e.g., display 518). In some embodiments, processor 502 includes and/or is used to execute/perform processes 300 and 400 described above with respect to FIGS. 3 and 4.

Processor 502 is coupled bi-directionally with memory 510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 502. Also as is well known in the art, primary storage typically includes basic operating instructions, program code, data and objects used by the processor 502 to perform its functions (e.g., programmed instructions). For example, memory 510 can include any suitable computer-readable storage media, described below, depending on whether, for example, data access needs to be bi-directional or unidirectional. For example, processor 502 can also directly and very rapidly retrieve and store frequently needed data in a cache memory (not shown).

A removable mass storage device 512 provides additional data storage capacity for the computer system 500 and is coupled either bi-directionally (read/write) or uni-directionally (read only) to processor 502. For example, storage 512 can also include computer-readable media such as magnetic tape, flash memory, PC-CARDS, portable mass storage devices, holographic storage devices, and other storage devices. A fixed mass storage 520 can also, for example, provide additional data storage capacity. The most common example of mass storage 520 is a hard disk drive. Mass storage 512, 520 generally store additional programming instructions, data, and the like that typically are not in active use by the processor 502. It will be appreciated that the information retained within mass storages 512 and 520 can be incorporated, if needed, in standard fashion as part of memory 510 (e.g., RAM) as virtual memory.

In addition to providing processor 502 access to storage subsystems, bus 514 can also be used to provide access to other subsystems and devices. As shown, these can include a display monitor 518, a network interface 516, a keyboard 504, and a pointing device 506, as well as an auxiliary input/output device interface, a sound card, speakers, and other subsystems as needed. For example, the pointing device 506 can be a mouse, stylus, track ball, or tablet, and is useful for interacting with a graphical user interface.

The network interface 516 allows processor 502 to be coupled to another computer, computer network, or telecommunications network using a network connection as shown. For example, through the network interface 516, the processor 502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502 or can be performed across a network such as the Internet, intranet networks, or local area networks, in conjunction with a remote processor that shares a portion of the processing. Additional mass storage devices (not shown) can also be connected to processor 502 through network interface 516.

An auxiliary I/O device interface (not shown) can be used in conjunction with computer system 500. The auxiliary I/O device interface can include general and customized interfaces that allow the processor 502 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 5 is but an example of a computer system suitable for use with the various embodiments disclosed herein. Other computer systems suitable for such use can include additional or fewer subsystems. In addition, bus 514 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a distance between two wireless access points of two wireless local area networks;
   determining a calculated signal strength corresponding to the distance;
   receiving one or more signal strengths associated with communication between the two wireless access points;
   determining a difference between a first value associated with the received one or more signal strengths and a second value associated with the calculated signal strength;
   comparing the difference to a threshold difference value to determine an environment assessment result; and
   based on the environment assessment result, selecting by a radio resource management (RRM) controller an option among a plurality of radio resource management scheme options for at least the two wireless access points.

2. The method of claim 1, wherein the RRM controller is executed on a cloud computing platform.

3. The method of claim 1, wherein the RRM controller is executed by software or firmware executed on at least one of the two wireless access points.

4. The method of claim 1, further comprising:
   determining the calculated signal strength corresponding to the distance based on a radio propagation model, and wherein the calculated signal strength comprises an estimated received signal strength indicator (RSSI) at one of the two wireless access points.

5. The method of claim 1, wherein the one or more signal strengths associated with the communication between the two wireless access points comprise one or more received signal strength indicators (RSSIs).

6. The method of claim 1, wherein the first value associated with the received one or more signal strengths comprises an average of the received one or more signal strengths over a period of time.

7. The method of claim 1, wherein the difference between the first value associated with the received one or more signal strengths and the second value associated with the calculated signal strength comprises an absolute value.

8. The method of claim 1, further comprising:
   in response to the difference being less than or equal to the threshold difference value, evaluating the environment assessment result as pass; and
   in response to the difference being greater than the threshold difference value, evaluating the environment assessment result as fail.

9. The method of claim 1, further comprising: in response to the environment assessment result being evaluated as fail, selecting a dynamic measurement radio resource management technique for at least the two wireless access points, wherein the dynamic measurement radio resource management technique uses dynamic measurements collected by Wi-Fi devices or one or more of the two wireless access points to optimize configurations for the two wireless access points.

10. The method of claim 9, wherein the dynamic measurements comprise statistics or metrics of a radio frequency (RF) environment.

11. The method of claim 1, further comprising: in response to the environment assessment result being evaluated as pass, selecting a model-based radio resource management technique for at least the two wireless access points, wherein the model-based radio resource management technique combines modeling with a model and optimization to optimize configurations for the two wireless access points.

12. The method of claim 11, wherein the model comprises a digital-twin model.

13. The method of claim 11, where the model comprises a plurality of independent variables, wherein the plurality of independent variables comprises one or more of the following: locations of the two wireless access points, distances between the two wireless access points, or locations of Wi-Fi devices connected to at least one of the two wireless access points.

14. A system, comprising:
   one or more processors configured to:
      receive a distance between two wireless access points of two wireless local area networks;
      determine a calculated signal strength corresponding to the distance;
      receive one or more signal strengths associated with communication between the two wireless access points;
      determine a difference between a first value associated with the received one or more signal strengths and a second value associated with the calculated signal strength;
      compare the difference to a threshold difference value to determine an environment assessment result; and
      based on the environment assessment result, select an option among a plurality of radio resource management scheme options for at least the two wireless access points; and a memory coupled to at least one of the one or more processors and configured to provide the at least one of the one or more processors with instructions.

15. The system of claim 14, wherein the one or more processors are configured to:
in response to the environment assessment result being evaluated as fail, select a dynamic measurement radio resource management technique for at least the two wireless access points, wherein the dynamic measurement radio resource management technique uses dynamic measurements collected by Wi-Fi devices or one or more of the two wireless access points to optimize configurations for the two wireless access points.

16. The system of claim 15, wherein the dynamic measurements comprise statistics or metrics of a radio frequency (RF) environment.

17. The system of claim 14, the one or more processors are configured to:
in response to the environment assessment result being evaluated as pass, select a model-based radio resource management technique for at least the two wireless access points, wherein the model-based radio resource management technique combines modeling with a radio propagation model and optimization to optimize configurations for the two wireless access points.

18. A computer program product embodied in a non-transitory computer readable medium and comprising computer instructions for:
receiving a distance between two wireless access points of two wireless local area networks;
determining a calculated signal strength corresponding to the distance;
receiving one or more signal strengths associated with communication between the two wireless access points;
determining a difference between a first value associated with the received one or more signal strengths and a second value associated with the calculated signal strength;
comparing the difference to a threshold difference value to determine an environment assessment result; and
based on the environment assessment result, selecting an option among a plurality of radio resource management scheme options for at least the two wireless access points.

19. The computer program product of claim 18, further comprising computer instructions for: in response to the environment assessment result being evaluated as fail, selecting a dynamic measurement radio resource management technique for at least the two wireless access points, wherein the dynamic measurement radio resource management technique uses dynamic measurements collected by Wi-Fi devices or one or more of the two wireless access points to optimize configurations for the two wireless access points.

20. The computer program product of claim 18, further comprising computer instructions for: in response to the environment assessment result being evaluated as pass, selecting a model-based radio resource management technique for at least the two wireless access points, wherein the model-based radio resource management technique combines modeling with a model and optimization to optimize configurations for the two wireless access points.

* * * * *